United States Patent
Chew

(10) Patent No.: US 10,168,767 B2
(45) Date of Patent: Jan. 1, 2019

(54) INTERACTION MODE SELECTION BASED ON DETECTED DISTANCE BETWEEN USER AND MACHINE INTERFACE

(71) Applicant: Intel Corporation, Santa Clara, CA (US)

(72) Inventor: Yen Hsiang Chew, Georgetown (MY)

(73) Assignee: Intel Corporation, Santa Clara, CA (US)

(*) Notice: Subject to any disclaimer, the term of this patent is extended or adjusted under 35 U.S.C. 154(b) by 138 days.

(21) Appl. No.: 15/282,414

(22) Filed: Sep. 30, 2016

(65) Prior Publication Data

US 2018/0095524 A1    Apr. 5, 2018

(51) Int. Cl.
| | |
|---|---|
| *G06F 3/033* | (2013.01) |
| *G09G 5/08* | (2006.01) |
| *G06F 3/01* | (2006.01) |
| *G06F 3/03* | (2006.01) |
| *G06F 3/038* | (2013.01) |
| *G06F 3/14* | (2006.01) |
| *G06F 3/16* | (2006.01) |

(52) U.S. Cl.
CPC .............. *G06F 3/011* (2013.01); *G06F 3/017* (2013.01); *G06F 3/0304* (2013.01); *G06F 3/038* (2013.01); *G06F 3/167* (2013.01); *G06F 3/14* (2013.01); *G06F 3/16* (2013.01)

(58) Field of Classification Search
None
See application file for complete search history.

(56) References Cited

U.S. PATENT DOCUMENTS

| | | | |
|---|---|---|---|
| 2014/0009378 A1 | 1/2014 | Chew | |
| 2014/0365927 A1* | 12/2014 | Sakai | G06F 3/0488 715/764 |
| 2015/0177939 A1* | 6/2015 | Anderson | G06F 21/35 715/745 |
| 2016/0092877 A1 | 3/2016 | Chew | |
| 2017/0115727 A1* | 4/2017 | Matsuike | G06F 3/005 |
| 2017/0289766 A1* | 10/2017 | Scott | H04W 4/023 |

FOREIGN PATENT DOCUMENTS

WO    2014/204430    12/2014

* cited by examiner

*Primary Examiner* — Stephen T Reed
(74) *Attorney, Agent, or Firm* — Jordan IP Law, LLC

(57) ABSTRACT

An embodiment of an interaction mode selection apparatus may include a distance estimator to estimate a distance between a user and a part of a machine interface, and an interaction selector communicatively coupled to the distance estimator to select one or more active interaction modes from two or more available interaction modes based on the estimated distance. The distance estimator may include a depth sensor, a three-dimensional camera, a two-dimensional camera, an array of cameras, an array of microphones, an array of wireless access points, a beacon sensor, a proximity sensor, and/or an ultrasonic sensor. The available interaction modes may include a keyboard interaction mode, a mouse interaction mode, a touch interaction mode, a voice interaction mode, a gesture interaction mode, a body part cursor interaction mode, a body analysis interaction mode, and/or a facial analysis interaction mode. Other embodiments are disclosed and claimed.

24 Claims, 3 Drawing Sheets

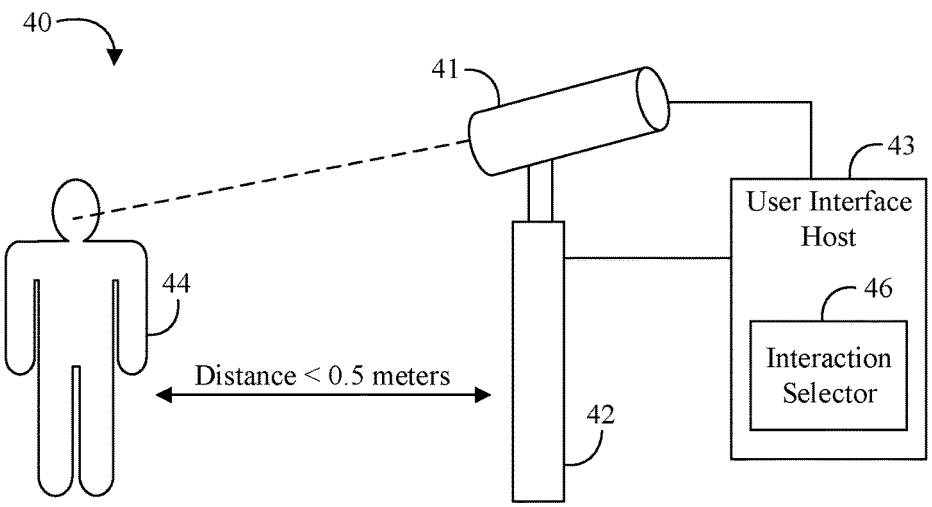
FIG. 4A
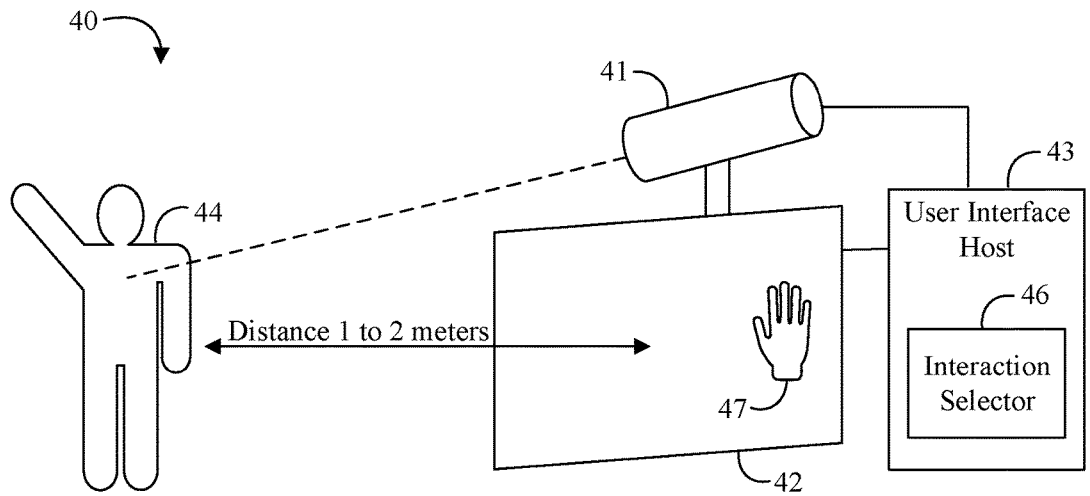
FIG. 4B
| Entry | Distance | Sensors | User Interaction Configuration Pointer |
|---|---|---|---|
| 1 | < 0.5 | Touch, microphones, RGB Camera | Pointer 1 |
| 2 | 0.5 - 1 | Depth Camera, RGB Camera | Pointer 2 |
| 3 | 1 - 2 | Depth Camera | Pointer 3 |
FIG. 4C

INTERACTION MODE SELECTION BASED ON DETECTED DISTANCE BETWEEN USER AND MACHINE INTERFACE

TECHNICAL FIELD

Embodiments generally relate to user interfaces. More particularly, embodiments relate to an interaction mode selection based on detected distance between user and machine interface.

BACKGROUND

Various types of input devices and user interactions supported by those input devices are well known. A keyboard and a computer mouse are common input devices that support user input for a computing device. A microphone may support a voice interaction with a computer system. A touchpad or touchscreen may support a touch interaction with a computing device. A camera may support gesture interaction or facial detection/recognition interaction with a computing device.

BRIEF DESCRIPTION OF THE DRAWINGS

The various advantages of the embodiments will become apparent to one skilled in the art by reading the following specification and appended claims, and by referencing the following drawings, in which:

FIGS. 4A and 4B are illustrations of another example of a user-machine interaction system according to an embodiment; and FIG. 4C is an example of a user interaction mode versus distance table according to an embodiment.

DESCRIPTION OF EMBODIMENTS

Figure 1:
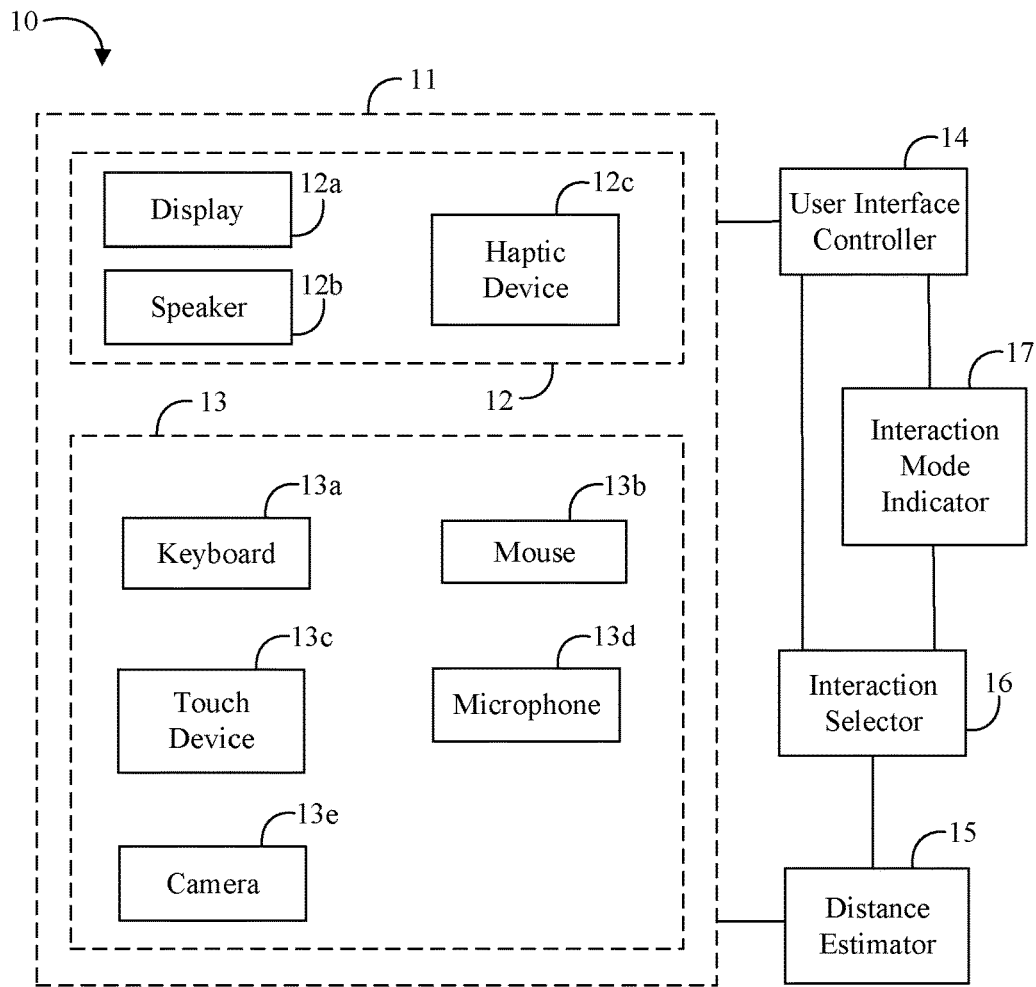
FIG. 1 is a block diagram of an example of a user-machine interaction system according to an embodiment.

Turning now to FIG. 1, an embodiment of a user-machine interaction system 10 may include a user-machine interface 11 including one or more output devices 12 (e.g. a display 12a, a speaker 12b, and/or a haptic feedback device 12c, etc.) and one or more input devices 13 (e.g. a keyboard 13a, a mouse 13b, a touch device 13c, a microphone 13d, and/or a camera 13e, etc.). Non-limiting examples of a touch device may include a trackpad and a touch screen. A user interface controller 14 may be communicatively coupled to the user-machine interface 11 to control an output of the display 12a, and to control available interaction modes between a user and the user-machine interface 11. The available interaction modes may include two or more of a keyboard interaction mode, a mouse interaction mode, a touch interaction mode, a voice interaction mode, a gesture interaction mode, a body part cursor interaction mode, a body analysis interaction mode or a facial analysis interaction mode. Non-limiting examples of facial analysis includes face detection, facial recognition, and facial expression recognition. A distance estimator 15 may be communicatively coupled to the user-machine interface 11 to estimate a distance between the user and a selected part of the user-machine interface 11. An interaction selector 16 may be communicatively coupled to the distance estimator 15 and the user interface controller 14 to select one or more active interaction modes from the available interaction modes based on the estimated distance.

Some embodiments of the user-machine interaction system 10 may further include an interaction mode indicator 17 communicatively coupled to the interaction selector 16 and the user interface controller 14 to indicate the selected one or more active interaction modes to the user. For example, the user interface controller 14 may be further configured to provide one or more of visual feedback on the display 12a, audio feedback to the speaker 12b, or tactile feedback to the haptic feedback device 12c to indicate the selected one or more active interaction modes. In addition, or alternatively, the user interface controller 14 may be configured to provide other feedback on another output device to indicate the selected one or more active interaction modes. The user will generally be a human, but may also be, for example, a robot or drone.

A problem with some conventional visual computing systems is that various interaction modes may be available, but the effectiveness of the various interaction modes may vary depending on the user's distance relative to the system. For example, voice interaction may be more effective when the user is close to the microphone but may become less effective as the user gets further away from the microphone (e.g. if the microphone is in a fixed position on the system but the user moves around) and the error rate for voice interaction may increase. Similarly, for facial analytics applications, if the user is too far away then the error rate may increase. There is generally an optimum distance or more effective range of distances for the user to be from the interface for the user to interact with the interface for each mode of interacting with the interface.

Efficacy of computer vision based user interactions such as gesture, face and people analytics may be distance dependent. Gesture control, face analytics or body analysis performed at a non-optimum or less effective distance from a camera sensor may have higher false positive results or higher error rate which may negatively affect the user's experience. Advantageously, some embodiments may enable computer vision sensors coupled to a user interface to be used at a more effective or optimum interaction distance and provide active feedback to the user on how to interact with the user interface based on the enabled sensors/interaction modes. The user may be empowered to know how to optimally or more effectively interact with a computer vision based user interface. Error rate may also be reduced, which advantageously may reduce user frustration. Another benefit from disabling detailed facial analytics and/or detailed gesture recognition when those interaction modes are less effective is that those functions are relatively complex and disabling them may increase computing bandwidth for other tasks.

Advantageously, some embodiments of the user-machine interaction system 10 may enhance the user experience because the modes for interacting with the user interface may change based on the distance between the user and the display screen of the user interface. For example, the user interaction modes to enable may be configurable based on a depth measurement between the user and the user interface's display screen. In some embodiments, subsets of sensors coupled to the user interface may be enabled or disabled based on the enabled interaction modes. Non-limiting examples of machines that may implement the various embodiments include an interactive kiosk, a vending machine, a gaming console or device, a desktop computer, a laptop, a notebook, a tablet, and a convertible computer (e.g. a 2-in-1 computer).

Computer vision based user interfaces (e.g. face analytics, gesture control, body analysis, voice control, etc.) may be trending towards becoming popular methods for end users to interact with a computing system. The capability to improve or optimize interaction modes and sensors may enhance the user experience for a user to interact with a computer vision based user interface which is a desirable feature. Advantageously, some embodiments may provide active feedback to the user on which interaction modes are enabled, empowering the user to more effectively interact with the computer vision based user interface by knowing what is expected of him or her to interact with the user interface. Providing active feedback to the user on which interaction modes are enabled may also reduce user frustration when a user interface doesn't seem to work because, for example, the user is not within an effective or optimum operating distance of the computer vision sensor and the user is not aware of this condition.

Advantageously, some embodiments of the system 10 may provide a better user experience by estimating a distance between the user and a part of the user-machine interface 11 and selecting one or more active interaction modes from two or more available interaction modes based on the estimated distance. For example, an embodiment of the user-machine interface system 10 may be implemented as a kiosk or a computing device (e.g. a laptop) and the camera 13e may include a depth measurement camera mounted near the top of the display 12a (e.g. a touchscreen display on the kiosk or computing device). For example, the camera 13e may have three-dimensional (3D) capture or measurement capability similar to an INTEL REALSENSE camera or a MICROSOFT KINECT camera.

The system 10 may detect the presence of a user and then measure a distance between the user and the camera 13e. The measured distance may be translated to estimate the distance between the user and the display 12a (e.g. based on a difference in the position of the camera 13e and the display 12a). The estimated distance may then be looked up in a storage record (e.g. a database) which indicates which modes of interaction may be most or sufficiently effective at the estimated distance. The system 10 may then enable some modes of interaction, disable some modes of interaction (e.g. which may be less effective or prone to error at the estimated distance) and/or change a characteristic of a mode of interaction (e.g. reduce power of an infrared (IR) emitter, perform/skip noise cancellation, perform/skip facial expression analysis, perform/skip finger-based gesture recognition, etc.) based on what is indicated in the storage record.

Embodiments of each of the above user-machine interface 11, user interface controller 14, distance estimator 15, interaction selector 16, interaction mode indicator 17, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or in fixed-functionality logic hardware using circuit technology such as, for example, application specific integrated circuit (ASIC), complementary metal oxide semiconductor (CMOS) or transistor-transistor logic (TTL) technology, or any combination thereof. Alternatively, or additionally, these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++, C# or the like and conventional procedural programming languages, such as the "C" programming language or similar programming languages.

Figure 2:
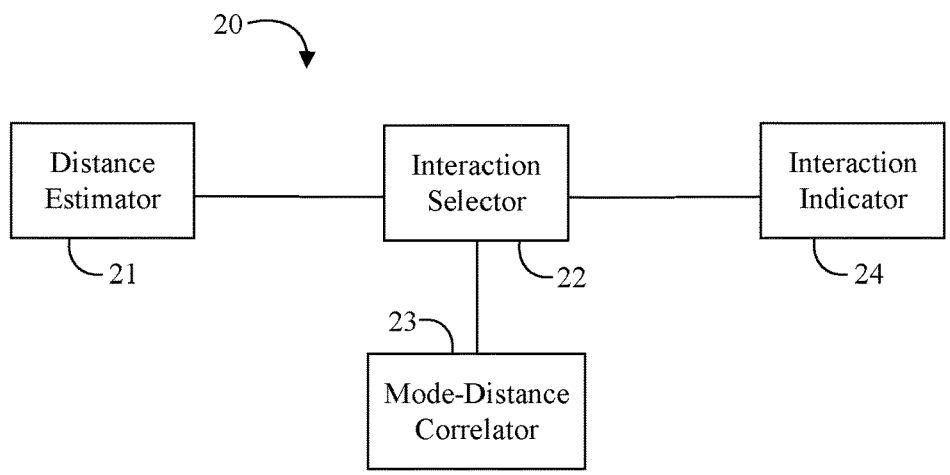
FIG. 2 is a block diagram of an example of an interaction mode selection apparatus according to an embodiment.

Turning now to FIG. 2, an embodiment of an interaction mode selection apparatus 20 may include a distance estimator 21 to estimate a distance between a user and a part of a user-machine interface, and an interaction selector 22 communicatively coupled to the distance estimator 21 to select one or more active interaction modes from two or more available interaction modes based on the estimated distance. For example, the distance estimator 21 may include one or more of a depth sensor (e.g. a depth camera), a 3D camera, a two-dimensional (2D) camera, an array of cameras, an array of microphones, an array of wireless access points (e.g. WIFI access points for device triangulation purposes), a beacon sensor, a proximity sensor, or an ultrasonic sensor. For example, the two or more available interaction modes may include two or more of a keyboard interaction mode, a mouse interaction mode, a touch interaction mode, a voice interaction mode, a gesture interaction mode, a body part cursor interaction mode, a body analysis interaction mode, or a facial analysis interaction mode.

Some embodiments of the interaction mode selection apparatus 20 may further include a mode-distance correlator 23 communicatively coupled to the interaction selector 22 to correlate the estimated distance between the user and the part of the user-machine interface with effective available interaction modes at the estimated distance. For example, the mode-distance correlator 23 may include a table of interaction modes to be enabled, with the table entries referenced by an estimated distance value. For example, the mode-distance correlator 23 may include a table of one or more of devices, sensors, modules, applications, or interaction mode characteristics to be enabled, with the table entries referenced by an estimated distance value. The interaction mode selection apparatus 20 may also include an interaction indicator 24 communicatively coupled to the interaction selector 22 to indicate the selected one or more active interaction modes to the user.

Numerous devices and/or techniques may be utilized to implement an embodiment of a suitable distance estimator 21. As noted above, a depth camera may include suitable hardware and software to directly provide a depth or distance measurement from the camera which may be readily translated to an accurate distance estimate (e.g. +/−a few centimeters). For example, a depth camera may form a virtual plane in front of a display screen so when the user or object goes into the virtual plane the distance may be measured. Additionally, or alternatively, a system utilizing a depth camera may perform face detection and then measure the distance from center of the detected face to the camera (e.g. face detection may be less complex than facial recognition or facial analytics). Additionally, or alternatively, a system utilizing a depth camera may detect a torso, hand, or other body part and measure the distance between the detected body part and the camera to estimate the distance between the user and the relevant part of the user-machine interface. Some embodiments may support multi-user detection with respective distance estimates for each user.

Depth cameras may provide relatively high accuracy. However, some embodiments don't require high accuracy or even actual distance measurements. In some embodiments, the estimated distance may be represented by proximity levels (e.g. very close, close, intermediate, far, very far, etc.). A proximity sensor may use radar or ultrasonic waves to determine how close an object or user is to the sensor (e.g. an ultrasonic rangefinder). Some sensors may produce an output signal in proportion to the sensed proximity. The output signal may be converted to a digital value and further processed to produce an accurate enough distance estimate. Even with no direct measurement of distance, an estimated distance may be extrapolated by a 2D camera, an array of 2D cameras, and/or an array of microphones. For example, a single 2D camera may be calibrated by capturing a calibration image of the user's face at a known distance and may thereafter extrapolate an estimated distance by capturing a new image of the user and determining the number of pixels between the eyes or other facial features as compared to the calibration image. Such devices and/or techniques may be utilized in addition to or alternative to depth cameras or other distance estimation devices or techniques.

Additionally, or alternatively, distance may be estimated based on a device carried by the user. Some devices may provide a relatively accurate location service (e.g. a global positioning satellite (GPS) device) that may be utilized to estimate the distance. Additionally, or alternatively, distance may be estimated based on a signal strength of a wireless signal emitted by a smartphone or wearable device of the user. For example, Near Field Communication (NFC) may be a relatively close range signal, Bluetooth may be an intermediate range signal, and a wireless local area network (WLAN) product based on the Institute of Electrical and Electronics Engineers (IEEE) 802.11 standards (e.g. Wi-Fi) may be a relatively longer range signal. Triangulation techniques may provide further accuracy to result in an accurate enough distance estimate from a wireless signal emanating from the user's device(s). These techniques may be utilized in addition to or alternative to depth cameras or other distance estimation devices or techniques. Given the benefit of the present specification, numerous other embodiments for a suitable distance estimator may occur to those skilled in the art.

Embodiments of each of the above distance estimator 21, interaction selector 22, mode-distance correlator 23, interaction indicator 24, and other components of the interaction mode selection apparatus 20 may be implemented in hardware, software, or any combination thereof. For example, hardware implementations may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++, C# or the like and conventional procedural programming languages, such as the "C" programming language or similar programming languages.

Figure 3A:
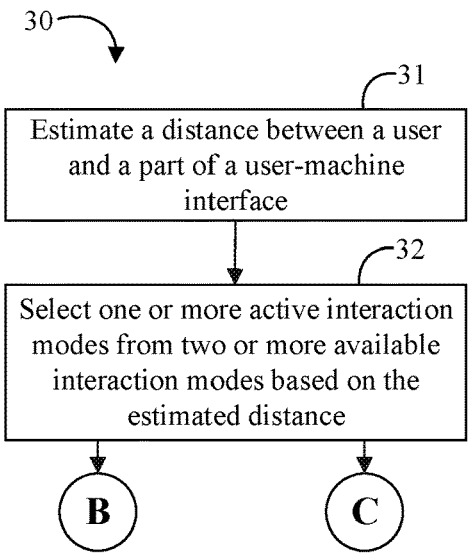
FIGS. 3A to 3C are flowcharts of an example of a method of selecting an interaction mode according to an embodiment.
Figure 3B:
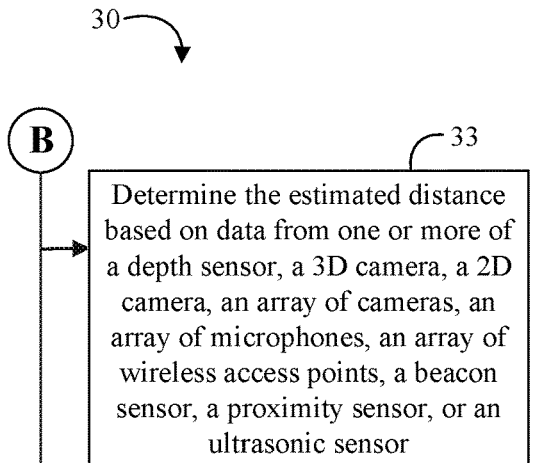
Figure 3C:
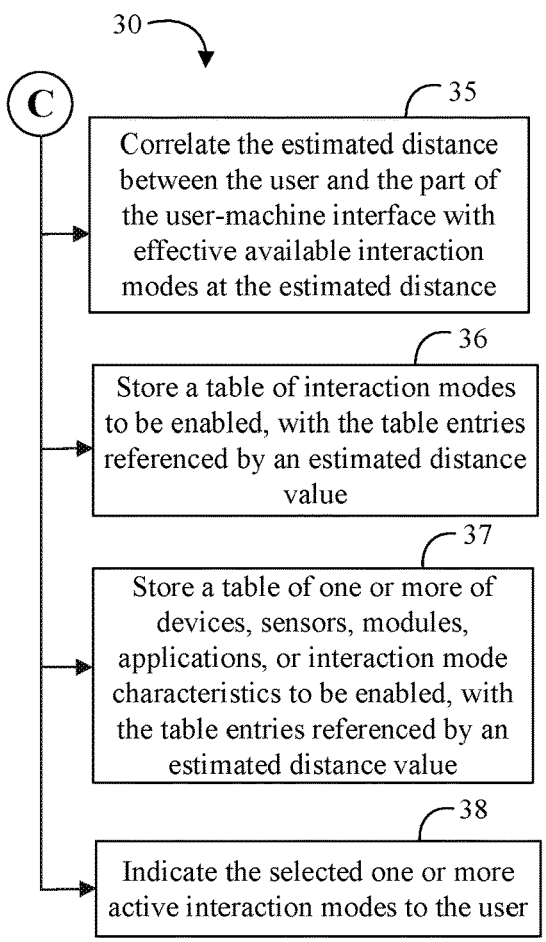

Turning now to FIGS. 3A to 3C, an embodiment of a method 30 of selecting an interaction mode may include estimating a distance between a user and a part of a user-machine interface at block 31, and selecting one or more active interaction modes from two or more available interaction modes based on the estimated distance at block 32. For example, estimating the distance between the user and the part of the user-machine interface may include determining the estimated distance based on data from one or more of a depth sensor, a 3D camera, a 2D camera, an array of cameras, an array of microphones, an array of wireless access points, a beacon sensor, a proximity sensor, or an ultrasonic sensor at block 33. For example, the two or more available interaction modes may include two or more of a keyboard interaction mode, a mouse interaction mode, a touch interaction mode, a voice interaction mode, a gesture interaction mode, a body part cursor interaction mode, a body analysis interaction mode, or a facial analysis interaction mode at block 34.

Some embodiments of the method 30 may further include correlating the estimated distance between the user and the part of the user-machine interface with effective available interaction modes at the estimated distance at block 35. For example, the method 30 may also include storing a table of interaction modes to be enabled, with the table entries referenced by an estimated distance value at block 36. The method 30 may also include storing a table of one or more of devices, sensors, modules, applications, or interaction mode characteristics to be enabled, with the table entries referenced by an estimated distance value at block 37. Some embodiments of the method 30 may further include indicating the selected one or more active interaction modes to the user at block 38.

Embodiments of the method 30 may be implemented in a user-machine interaction system or an interaction mode selection apparatus such as, for example, those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++, C# or the like and conventional procedural programming languages, such as the "C" programming language or similar programming languages. For example, the method 30 may be implemented on a computer readable medium as described in connection with Examples 18 to 24 below.

Turning now to FIGS. 4A to 4C, an embodiment of a user-machine interaction system 40 may include a depth sensing camera 41 mechanically coupled to a user interface's display screen 42. The camera 41 and display 42 may be communicatively coupled to a user interface host 43 (e.g. a computing device) having suitable hardware, firmware, and/or software to detect and estimate a distance between a user 44 and the display 42. The user interface host 43 may store a user interaction mode versus distance table 45. For example, each entry in the table 45 may contain a distance parameter (e.g. minimum and maximum depth), a sensor entry, and a user interaction configuration pointer.

In accordance with some embodiments, when the depth sensing camera 41 may detect the user 44 in front of the user interface display screen 42, a depth sensor may then measure the distance between user 44 and the display screen 42 and may forward the measurement to an interaction selector 46 of the user interface host 43. The interaction selector 46 may compare the measured distance with the distance parameters in user interaction mode versus distance table 45 to find a matching table entry. The interaction selector 46 may then configure the sensors and/or software drivers of the user interface host 43 based on configuration information in the matched table entry to enable/disable the user interaction modes.

For example, at an estimated distance of less than one half meter (<0.5) from the screen 42 (e.g. see FIG. 4A), the system 40 may determine that voice, touch, and facial analytics (e.g. the camera 41 can effectively capture face biometrics of the user 44) will be enabled (e.g., see entry 1 in the table 45). Keyboard, trackpad, and mouse interactions may also be enabled. If the user 44 moves to be between one and two meters (1-2) from the screen 42 (e.g. see FIG. 4B), then the face may be too far away for detailed analytics, the user 44 is too far away to touch the screen, and/or the user 44 may be too far away from microphone for effective voice control (keyboard, trackpad, and mouse interactions may also be ineffective at that distance range). The system 40 may accordingly determine that hand-level gesture control will be enabled (e.g., see entry 3 in the table 45). An interaction indicator (not shown) may cause a visual indication to be shown on the display 42, such as a hand icon 47 which indicates that the user may interact with the interface through gesture-controlled cursor interaction. Between 0.5 and 1 meters (0.5-1) may be close enough for finger-level gesture resolution and the red-green-blue (RGB) camera may be enabled (e.g. see entry 2 in the table 45) so that all five fingers may be resolved to issue commands or interact with the interface.

Advantageously, some embodiments may involve a computer vision based user interaction system where the modes for a user to interact with a user interface may change based on an estimated or measured distance between the user and the user interface's display screen (or other part of the system). For example, some embodiments may include a user facing depth sensing camera (e.g. an INTEL REALSENSE camera with depth measurement capabilities) coupled to a user interface display screen. The depth camera may measure the distance between the user and the camera and use that data to estimate the distance between the user and the user interface display screen. Based on the measured distance, the system may determine the subset of sensors and modes of interacting with the user interface to enable. In some embodiments, when the mode of interacting with a user interface changes a subset of the graphical content of the user interface display screen may advantageously also change to inform or guide the user on how he or she may interact with the user interface.

As compared to a conventional system, some embodiments may improve or optimize the set of enabled sensors and/or software modules needed for a user to interact with a user interface while disabling others that may potentially interfere with the user interaction. For example, when a user is more than one and a half (1.5) meters away from a display screen a depth sensing camera may be configured to a cursor mode to enable a user to control a cursor on the display screen using hand gestures while the touchscreen interface and face analytics such as face recognition, gaze, gender, age group, skin tone, is the person wearing glasses, facial expression and emotion detection may be disabled because the user may not be able to touch the screen and the user may not be at an optimum or effective distance from the camera sensor to produce an accurate assessment of the person's facial features (e.g. a RGB video stream may be temporarily disabled). When the user is less than a half (0.5) meter from the display screen, the cursor mode may be disabled to allow the user to interact with the display screen using touch while face analytics may also be enabled (RGB video stream is re-enabled). The depth camera's IR emitter power may also be reduced to reduce IR glare on user.

Certain modes of interacting with a user interface may be more effective at close distances (e.g. touch, voice control, and face analytics) while others may work better at intermediate (e.g. gesture) or longer distances (e.g. hand or body part cursor and body analysis). At longer distances hand cursor control, for example, may generally be utilized. But other body parts (e.g. a head or torso) or an object that someone is holding (e.g. a wand) may additionally or alternatively be used for cursor control.

In accordance with some embodiments, a user-machine interaction system advantageously enables a user to use the most appropriate modes of interacting with a user interface based on their relative distance from the user interface (e.g. the display screen). For example, a virtual fitting room mirror display system may perform body analysis and enable the user to use hand cursor to control on the mirror display screen when he/she is estimated to be more than 1.5 meters away from the mirror display during a virtual fitting session. Body analysis may include body measurements such as making size measurements on the body parts (e.g. height, body shape, body size, relative positions and sizes of each body parts. Such measurements may be utilized for augmented reality virtual clothes fitting such as dress, shirt, pants, shoes, gloves, glasses, masks, hats, jewelry, etc.

Body analysis may also include obtaining the positions, movements and orientations of various body parts and their interactions (e.g. hands, elbows, shoulders, head, legs, torso, etc.) and using this information to actuate or invoke an action. For a gaming system, for example, moving a set of body parts may invoke an avatar or a virtual character to dance according to the various body movements. Rotating two hands as if the person is holding and turning a steering wheel may change the direction of a virtual car or a virtual object. Body analysis may also include determining the pose of a person (e.g. standing, sitting, squatting, bending, hands lifted, legs together, standing on one leg, etc.) or the orientation of a person's body (e.g. a direction which a person is facing).

When the user is done with the virtual fitting session, he/she may approach the mirror display for purchase or other options. When the user is estimated to be less than 0.5 meters from the display, body measurement and cursor mode may be disabled to allow the user to interact with the display using touch, voice control and face analytics. In some embodiments, the mirror display's graphical content may change (e.g. active tiles may appear showing microphones enabled) when the system is in touch/voice control mode.

In some embodiments, for example, the sensor entry may contain information about sensors to enable/disable (e.g. proximity sensor, depth sensor, camera sensor, microphones, etc.). In some embodiments, disabling a user interaction mode may comprise simply ignoring or bypassing the sensor data that includes the interaction modes without necessarily disabling sensors or software modules. A sensor may sometimes be disabled to not interfere with other communications or other sensors. For example, if the user is not close enough to the microphone then the microphone may be turned off to avoid picking up stray sounds like background noise (e.g. a false communication). In addition, or alternatively, a sensor's operational characteristic or an associated firmware and/or software processing of the sensor may be modified. For example, a gain of the microphone may be increased if the environment is otherwise noise-free to maintain effective voice interaction as the user moves farther away from the interface. Another example is that a noise filtering algorithm may be utilized when the user is farther away from the interface, but skipped or not utilized when the user is closer to the interface. Another example is that an IR laser emitter sensor power may be lowered if the user is close to the screen to avoid distracting light.

In some embodiments, the table 45 may include a user interaction configuration pointer entry which may contain a pointer that points to a file or a data structure that contains additional information needed to enable/disable a user interaction mode. In some embodiments, enabling/disabling a user interaction mode may include invoking one or more drivers or software modules to perform/skip certain operations to activate/deactivate the user interaction mode. For example, a software module, an application, or an algorithm may be enabled/disabled or changed based on distance (e.g. face detection versus face analytics; finger resolution versus hand resolution). Advantageously, computation complexity and error rate may both be decreased if complex user interactions are disabled because the user is too far from the interface for such interactions to be effective.

In some embodiments, the table 45 may include overlapping distance ranges to avoid excessive dithering between interaction modes (e.g. 0-0.7 m; 0.6-1.2 m; 1.1-2 m). For example, as long as the estimated distance stays within a particular range the interaction modes may stay the same and the user must move far enough into another range before the interaction modes would switch. In addition, or alternatively, a timer may be utilized to avoid excessive dithering between interaction modes.

The table 45 may be locked down for a particular system (e.g. a kiosk) or may be configurable. Users may be able to edit preferences in the table (e.g. indicate user selectable distances and/or interaction modes through a settings interface) or the configuration may be fixed in firmware (e.g. only to be updated by the system provider). Separate tables may be provided for different users. Users may be able to register devices and/or interaction modes (e.g. add a smartphone or a headset). For example, if the user is close, the system microphone may be enabled for voice commands. If the user moves further away, communication may be established to the headset or the smartphone microphone for voice commands (e.g. a Bluetooth connection made with the user's permission).

For example, a user's device like a smartphone may be utilized to provide an additional interface interaction or to provide feedback to the user. For example, the system may cause the headset or the smartphone to beep when a gesture command is successfully received. In addition, or alternatively, if the smartphone includes a haptic feedback device (e.g. vibration) the system may cause the smartphone to give haptic feedback to the user. If the system includes machine vision, object recognition, and/or object detection capability, the system may automatically adjust the table or modes of interaction based on the detected available devices. For example, the system may detect that the headset or smartphone is on a nearby table and therefore not with user and not available for additional voice interaction or feedback.

In some embodiments, the user may be identified to or recognized by the system. The system may then track user and reject interactions from another intervening user or object. In addition, or alternatively, some embodiments may support multi-user interaction. Separate distance estimates may be made for each user with corresponding interaction modes. A separate mode-distance table may be utilized for each user depending on the devices available to the users. For example, if a farther user wears a headset then voice interaction may remain enabled for that user while a closer user may have appropriate sensors enabled for facial biometrics.

Additional Notes And Examples

Example 1 may include a user-machine interaction system, comprising a user-machine interface including one or more output devices and one or more input devices, wherein the one or more output devices include one or more of a display, a speaker, or a haptic feedback device; and wherein the one or more input devices include one or more of a keyboard, a mouse, a touch-input device, a microphone, or a camera, a user interface controller communicatively coupled to the machine interface to control an output of the one or more of the display, the speaker, or the haptic feedback device, and to control available interaction modes between a user and the machine interface, the available interaction modes including two or more of a keyboard interaction mode, a mouse interaction mode, a touch interaction mode, a voice interaction mode, a gesture interaction mode, a body part cursor interaction mode, a body analysis interaction mode, or a facial analysis interaction mode, a distance estimator communicatively coupled to the machine interface to estimate a distance between the user and a selected part the machine interface, and an interaction selector communicatively coupled to the distance estimator and the user interface controller to select one or more active interaction modes from the available interaction modes based on the estimated distance.

Example 2 may include the user-machine interaction system of Example 1, further comprising an interaction mode indicator communicatively coupled to the interaction selector and the user interface controller to indicate the selected one or more active interaction modes to the user.

Example 3 may include the user-machine interaction system of Example 2, wherein the user interface controller is further to provide one or more of visual feedback on the display, audio feedback to the speaker, or tactile feedback to the haptic feedback device to indicate the selected one or more active interaction modes.

Example 4 may include an interaction mode selection apparatus, comprising a distance estimator to estimate a distance between a user and a part of a user-machine interface, and an interaction selector communicatively coupled to the distance estimator to select one or more active interaction modes from two or more available interaction modes based on the estimated distance.

Example 5 may include the interaction mode selection apparatus of Example 4, wherein the distance estimator includes one or more of a depth sensor, a three-dimensional camera, a two-dimensional camera, an array of cameras, an array of microphones, an array of wireless access points, a beacon sensor, a proximity sensor, or an ultrasonic sensor.

Example 6 may include the interaction mode selection apparatus of any of Examples 4 to 5, wherein the two or more available interaction modes include two or more of a keyboard interaction mode, a mouse interaction mode, a touch interaction mode, a voice interaction mode, a gesture interaction mode, a body part cursor interaction mode, a body analysis interaction mode, or a facial analysis interaction mode.

Example 7 may include the interaction mode selection apparatus of any of Examples 4 to 6, further comprising a mode-distance correlator communicatively coupled to the interaction selector to store a correlation of the estimated distance between the user and the part of the user-machine interface with effective available interaction modes at the estimated distance.

Example 8 may include the interaction mode selection apparatus of Example 7, wherein the mode-distance correlator includes a table of interaction modes to be enabled, with the table entries referenced by an estimated distance value.

Example 9 may include the interaction mode selection apparatus of any of Examples 7 to 8, wherein the mode-distance correlator includes a table of one or more of devices, sensors, modules, applications, or interaction mode characteristics to be enabled, with the table entries referenced by an estimated distance value.

Example 10 may include the interaction mode selection apparatus of any of Examples 4 to 9, further comprising an interaction indicator to indicate the selected one or more active interaction modes to the user.

Example 11 may include a method of selecting an interaction mode, comprising estimating a distance between a user and a part of a user-machine interface, and selecting one or more active interaction modes from two or more available interaction modes based on the estimated distance.

Example 12 may include the method of selecting an interaction mode of Example 11, wherein estimating the distance between the user and the part of the user-machine interface includes determining the estimated distance based on data from one or more of a depth sensor, a three-dimensional camera, a two-dimensional camera, an array of cameras, an array of microphones, an array of wireless access points, a beacon sensor, a proximity sensor, or an ultrasonic sensor.

Example 13 may include the method of selecting an interaction mode of any of Examples 11 to 12, wherein the two or more available interaction modes include two or more of a keyboard interaction mode, a mouse interaction mode, a touch interaction mode, a voice interaction mode, a gesture interaction mode, a body part cursor interaction mode, a body analysis interaction mode, or a facial analysis interaction mode.

Example 14 may include the method of selecting an interaction mode of any of Examples 11 to 13, further comprising correlating the estimated distance between the user and the part of the user-machine interface with effective available interaction modes at the estimated distance.

Example 15 may include the method of selecting an interaction mode of Example 14, further comprising storing a table of interaction modes to be enabled, with the table entries referenced by an estimated distance value.

Example 16 may include the method of selecting an interaction mode of any of Examples 14 to 15, further comprising storing a table of one or more of devices, sensors, modules, applications, or interaction mode characteristics to be enabled, with the table entries referenced by an estimated distance value.

Example 17 may include the method of selecting an interaction mode of any of Examples 11 to 16, further comprising indicating the selected one or more active interaction modes to the user.

Example 18 may include at least one computer readable medium, comprising a set of instructions, which when executed by a computing device, cause the computing device to estimate a distance between a user and a part of a user-machine interface, and select one or more active interaction modes from two or more available interaction modes based on the estimated distance.

Example 19 may include the at least one computer readable medium of Example 18, comprising a further set of instructions, which when executed by a computing device, cause the computing device to determine the estimated distance based on data from one or more of a depth sensor, a three-dimensional camera, a two-dimensional camera, an array of cameras, an array of microphones, an array of wireless access points, a beacon sensor, a proximity sensor, or an ultrasonic sensor.

Example 20 may include the at least one computer readable medium of any of Examples 18 to 19, wherein the two or more available interaction modes include two or more of a keyboard interaction mode, a mouse interaction mode, a touch interaction mode, a voice interaction mode, a gesture interaction mode, a body part cursor interaction mode, a body analysis interaction mode, or a facial analysis interaction mode.

Example 21 may include the at least one computer readable medium of any of Examples 18 to 20, comprising a further set of instructions, which when executed by a computing device, cause the computing device to correlate the estimated distance between the user and the part of the user-machine interface with effective available interaction modes at the estimated distance.

Example 22 may include the at least one computer readable medium of Example 21, comprising a further set of instructions, which when executed by a computing device, cause the computing device to store a table of interaction modes to be enabled, with the table entries referenced by an estimated distance value.

Example 23 may include the at least one computer readable medium of any of Examples 21 to 22, comprising a further set of instructions, which when executed by a computing device, cause the computing device to store a table of one or more of devices, sensors, modules, applications, or interaction mode characteristics to be enabled, with the table entries referenced by an estimated distance value.

Example 24 may include the at least one computer readable medium of any of Examples 18 to 23, comprising a further set of instructions, which when executed by a computing device, cause the computing device to indicate the selected one or more active interaction modes to the user.

Example 25 may include an interaction mode selection apparatus, comprising means for estimating a distance between a user and a part of a user-machine interface, and means for selecting one or more active interaction modes from two or more available interaction modes based on the estimated distance.

Example 26 may include the interaction mode selection apparatus of Example 25, wherein means for estimating the distance between the user and the part of the user-machine interface includes means for determining the estimated distance based on data from one or more of a depth sensor, a three-dimensional camera, a two-dimensional camera, an array of cameras, an array of microphones, an array of wireless access points, a beacon sensor, a proximity sensor, or an ultrasonic sensor.

Example 27 may include the interaction mode selection apparatus of any of Examples 25 to 26, wherein the two or more available interaction modes include two or more of a keyboard interaction mode, a mouse interaction mode, a touch interaction mode, a voice interaction mode, a gesture interaction mode, a body part cursor interaction mode, a body analysis interaction mode, or a facial analysis interaction mode.

Example 28 may include the interaction mode selection apparatus of any of Examples 25 to 27, further comprising means for correlating the estimated distance between the user and the part of the user-machine interface with effective available interaction modes at the estimated distance.

Example 29 may include the interaction mode selection apparatus of Example 28, further comprising means for storing a table of interaction modes to be enabled, with the table entries referenced by an estimated distance value.

Example 30 may include the interaction mode selection apparatus of any of Examples 28 to 29, further comprising means for storing a table of one or more of devices, sensors, modules, applications, or interaction mode characteristics to be enabled, with the table entries referenced by an estimated distance value.

Example 31 may include the interaction mode selection apparatus of any of Examples 25 to 30, further comprising means for indicating the selected one or more active interaction modes to the user.

Embodiments are applicable for use with all types of semiconductor integrated circuit ("IC") chips. Examples of these IC chips include but are not limited to processors, controllers, chipset components, PLAs, memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C. As used in this application and in the claims, a list of items joined by the term "two or more of" may mean any combination of two or more of the listed terms. For example, the phrases "two or more of A, B or C" may mean A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. A user-machine interaction system, comprising:
a user-machine interface including one or more output devices and one or more input devices, wherein the one or more output devices include one or more of a display, a speaker, or a haptic feedback device, and wherein the one or more input devices include one or more of a keyboard, a mouse, a touch-input device, a microphone, or a camera;
a user interface controller communicatively coupled to the user-machine interface to control an output of the one or more of the display, the speaker, or the haptic feedback device, and to control available interaction modes between a user and the user-machine interface, the available interaction modes including two or more of a keyboard interaction mode, a mouse interaction mode, a touch interaction mode, a voice interaction mode, a gesture interaction mode, a body part cursor interaction mode, a body analysis interaction mode, or a facial analysis interaction mode;
a distance estimator communicatively coupled to the user-machine interface to estimate a distance between the user and a selected part the user-machine interface; and
an interaction selector communicatively coupled to the distance estimator and the user interface controller to select one or more active interaction modes from the available interaction modes based on the estimated distance, wherein when the one or more active interaction modes are selected, the interaction selector is to:
identify an enabled sensor to be enabled to sense an input of the user to the user-machine interface; and
after the enabled sensor is identified as being enabled, identify a modification, based on the estimated distance, to one or more of an operational characteristic of the enabled sensor, a firmware of the enabled sensor, or a software processing of the enabled sensor.

2. The user-machine interaction system of claim 1, further comprising:
an interaction mode indicator communicatively coupled to the interaction selector and the user interface controller to indicate the selected one or more active interaction modes to the user.

3. The user-machine interaction system of claim 2, wherein the user interface controller is further to provide one or more of visual feedback on the display, audio feedback to the speaker, or tactile feedback to the haptic feedback device to indicate the selected one or more active interaction modes.

4. An interaction mode selection apparatus, comprising:
a distance estimator to estimate a distance between a user and a part of a user-machine interface; and
an interaction selector communicatively coupled to the distance estimator to select one or more active interaction modes from two or more available interaction modes based on the estimated distance, wherein when the one or more active interaction modes are selected, the interaction selector is to:
identify an enabled sensor to be enabled to sense an input of the user to the user-machine interface; and
after the enabled sensor is identified as being enabled, identify a modification, based on the estimated distance, to one or more of an operational characteristic of the enabled sensor, a firmware of the enabled sensor, or a software processing of the enabled sensor.

5. The interaction mode selection apparatus of claim 4, wherein the distance estimator includes one or more of a depth sensor, a three-dimensional camera, a two-dimensional camera, an array of cameras, an array of microphones, an array of wireless access points, a beacon sensor, a proximity sensor, or an ultrasonic sensor.

6. The interaction mode selection apparatus of claim 4, wherein the two or more available interaction modes include two or more of a keyboard interaction mode, a mouse interaction mode, a touch interaction mode, a voice interaction mode, a gesture interaction mode, a body part cursor interaction mode, a body analysis interaction mode, or a facial analysis interaction mode.

7. The interaction mode selection apparatus of claim 4, further comprising:
a mode-distance correlator communicatively coupled to the interaction selector to store a correlation of the estimated distance between the user and the part of the user-machine interface with effective available interaction modes at the estimated distance.

8. The interaction mode selection apparatus of claim 7, wherein the mode-distance correlator includes a table of table entries including interaction modes to be enabled, with the table entries referenced by an estimated distance value.

9. The interaction mode selection apparatus of claim 7, wherein the mode-distance correlator includes a table of table entries including one or more of devices, sensors including the enabled sensor, modules, applications, or interaction mode characteristics to be enabled, with the table entries referenced by an estimated distance value.

10. The interaction mode selection apparatus of claim 4, further comprising:
an interaction indicator to indicate the selected one or more active interaction modes to the user, and
wherein the interaction selector is to identify the modification based on an environmental factor associated with the one or more active interaction modes.

11. A method of selecting an interaction mode, comprising:
estimating a distance between a user and a part of a user-machine interface;
selecting one or more active interaction modes from two or more available interaction modes based on the estimated distance;
when the one or more active interaction modes are selected,
identifying an enabled sensor to be enabled to sense an input of the user to the user-machine interface; and
after the enabled sensor is identified as being enabled, identifying a modification, based on the estimated distance, to one or more of an operational characteristic of the enabled sensor, a firmware of the enabled sensor, or a software processing of the enabled sensor.

12. The method of selecting an interaction mode of claim 11, wherein estimating the distance between the user and the part of the user-machine interface includes:
determining the estimated distance based on data from one or more of a depth sensor, a three-dimensional camera, a two-dimensional camera, an array of cameras, an array of microphones, an array of wireless access points, a beacon sensor, a proximity sensor, or an ultrasonic sensor.

13. The method of selecting an interaction mode of claim 11, wherein the two or more available interaction modes include two or more of a keyboard interaction mode, a mouse interaction mode, a touch interaction mode, a voice interaction mode, a gesture interaction mode, a body part cursor interaction mode, a body analysis interaction mode, or a facial analysis interaction mode.

14. The method of selecting an interaction mode of claim 11, further comprising:
correlating the estimated distance between the user and the part of the user-machine interface with effective available interaction modes at the estimated distance.

15. The method of selecting an interaction mode of claim 14, further comprising:
storing a table of table entries including interaction modes to be enabled, with the table entries referenced by an estimated distance value.

16. The method of selecting an interaction mode of claim 14, further comprising:
storing a table of table entries including one or more of devices, sensors including the enabled sensor, modules, applications, or interaction mode characteristics to be enabled, with the table entries referenced by an estimated distance value.

17. The method of selecting an interaction mode of claim 11, further comprising:
indicating the selected one or more active interaction modes to the user; and
wherein the identifying the modification is based on an environmental factor associated with the one or more active interaction modes.

18. At least one computer readable medium, comprising a set of instructions, which when executed by a computing device, cause the computing device to:
estimate a distance between a user and a part of a user-machine interface; and
select one or more active interaction modes from two or more available interaction modes based on the estimated distance; and
when the one or more active interaction modes are selected,
identify an enabled sensor to be enabled to sense an input of the user to the user-machine interface; and
after the enabled sensor is identified as being enabled, identify a modification, based on the estimated distance, to one or more of an operational characteristic of the enabled sensor, a firmware of the enabled sensor, or a software processing of the enabled sensor.

19. The at least one computer readable medium of claim 18, comprising a further set of instructions, which when executed by a computing device, cause the computing device to:

determine the estimated distance based on data from one or more of a depth sensor, a three-dimensional camera, a two-dimensional camera, an array of cameras, an array of microphones, an array of wireless access points, a beacon sensor, a proximity sensor, or an ultrasonic sensor.

20. The at least one computer readable medium of claim 18, wherein the two or more available interaction modes include two or more of a keyboard interaction mode, a mouse interaction mode, a touch interaction mode, a voice interaction mode, a gesture interaction mode, a body part cursor interaction mode, a body analysis interaction mode, or a facial analysis interaction mode.

21. The at least one computer readable medium of claim 18, comprising a further set of instructions, which when executed by a computing device, cause the computing device to:

correlate the estimated distance between the user and the part of the user-machine interface with effective available interaction modes at the estimated distance.

22. The at least one computer readable medium of claim 21, comprising a further set of instructions, which when executed by a computing device, cause the computing device to:

store a table of table entries including interaction modes to be enabled, with the table entries referenced by an estimated distance value.

23. The at least one computer readable medium of claim 21, comprising a further set of instructions, which when executed by a computing device, cause the computing device to:

store a table of table entries including one or more of devices, sensors including the enabled sensor, modules, applications, or interaction mode characteristics to be enabled, with the table entries referenced by an estimated distance value.

24. The at least one computer readable medium of claim 18, comprising a further set of instructions, which when executed by a computing device, cause the computing device to:

indicate the selected one or more active interaction modes to the user; and wherein the identify the modification is based on an environmental factor associated with the one or more active interaction modes.

* * * * *